United States Patent
Chiu

(10) Patent No.: US 11,966,607 B2
(45) Date of Patent: Apr. 23, 2024

(54) METHOD AND NON-TRANSITORY COMPUTER-READABLE STORAGE MEDIUM AND APPARATUS FOR ACCESSING TO ENCODING-HISTORY INFORMATION

(71) Applicant: Silicon Motion, Inc., Zhubei (TW)

(72) Inventor: Shen-Ting Chiu, Miaoli County (TW)

(73) Assignee: SILICON MOTION, INC., Zhubei (TW)

( * ) Notice: Subject to any disclaimer, the term of this patent is extended or adjusted under 35 U.S.C. 154(b) by 149 days.

(21) Appl. No.: 17/879,426

(22) Filed: Aug. 2, 2022

(65) Prior Publication Data
US 2023/0100865 A1    Mar. 30, 2023

Related U.S. Application Data

(60) Provisional application No. 63/249,702, filed on Sep. 29, 2021.

(30) Foreign Application Priority Data

Mar. 31, 2022    (CN) .......................... 202210333516.2

(51) Int. Cl.
    *G06F 3/06*      (2006.01)
    *G06F 11/10*     (2006.01)

(52) U.S. Cl.
    CPC ............ *G06F 3/064* (2013.01); *G06F 3/0619* (2013.01); *G06F 3/0679* (2013.01); *G06F 11/1068* (2013.01)

(58) Field of Classification Search
    CPC ...... G06F 3/064; G06F 3/0619; G06F 3/0679; G06F 11/1068
    See application file for complete search history.

(56) References Cited

U.S. PATENT DOCUMENTS 11,340,987 B1 *    5/2022    Gole ..................... G06F 3/0644
2007/0055905 A1 *    3/2007    Chou ................. G06F 11/1076
                                                                                              714/6.12
(Continued)

FOREIGN PATENT DOCUMENTS

CN         110688242 A     1/2020
CN         112463433 A     3/2021
(Continued)

*Primary Examiner* — Sean D Rossiter
(74) *Attorney, Agent, or Firm* — Birch, Stewart, Kolasch & Birch, LLP

(57) ABSTRACT

The invention relates to a method, a non-transitory computer-readable storage medium and an apparatus for accessing to encoding-history information. The method includes: providing a super-block formed by storage space of flash units, where the super-block includes zones, each zone includes super-page strings, and each super-page string includes pages across the flash units; and programming encoding-history information into a metadata section of a designated first page of a designated super-page string, thereby enabling a damaged page that is occurred in the designated super-page string of the designated zone to be recovered according to the encoding-history information. The encoding-history information includes a history profile and history entries. The history profile indicates which zone or zones are covered in the super-block, and a quantity of the history entries. Each history entry includes information indicating that a designated second page of the designated super-page string in a designated zone hasn't been passed through an engine to generate a parity for the designated super-page string.

20 Claims, 7 Drawing Sheets

(56) References Cited

U.S. PATENT DOCUMENTS

| | | | |
|---|---|---|---|
| 2014/0075268 A1 | 3/2014 | Yen | |
| 2017/0187395 A1* | 6/2017 | Watanabe | H03M 13/2927 |
| 2017/0315909 A1 | 11/2017 | Yang et al. | |
| 2018/0308512 A1* | 10/2018 | Maruyama | G11B 5/012 |
| 2019/0065309 A1* | 2/2019 | Chiang | G06F 11/1004 |
| 2019/0220353 A1 | 7/2019 | Yang et al. | |
| 2019/0304562 A1* | 10/2019 | Cai | G11C 29/38 |
| 2020/0075114 A1* | 3/2020 | Lin | G06F 11/1048 |
| 2021/0166774 A1* | 6/2021 | Cha | G11C 16/0483 |

FOREIGN PATENT DOCUMENTS

| | | |
|---|---|---|
| CN | 112823331 A | 5/2021 |
| TW | I470433 B | 1/2015 |
| TW | 202011392 A | 3/2020 |
| TW | I691966 B | 4/2020 |
| WO | WO2020/073233 A1 | 4/2020 |

* cited by examiner

METHOD AND NON-TRANSITORY COMPUTER-READABLE STORAGE MEDIUM AND APPARATUS FOR ACCESSING TO ENCODING-HISTORY INFORMATION

CROSS-REFERENCE TO RELATED APPLICATIONS

This application claims the benefit of priority to U.S. Provisional Application Ser. No. 63/249,702, filed on Sep. 29, 2021; and Patent Application No. 202210333516.2, filed in China on Mar. 31, 2022; the entirety of which is incorporated herein by reference for all purposes.

BACKGROUND

The disclosure generally relates to storage devices and, more particularly, to a method, a non-transitory computer-readable storage medium, and an apparatus for accessing to encoding-history information.

Flash memory devices typically include NOR flash devices and NAND flash devices. NOR flash devices are random access—a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Improving the protection capability of data stored in flash modules has always been an important issue affecting the data security of a flash controller. Thus, it is desirable to have an apparatus, a method, a non-transitory computer-readable storage medium, and an apparatus for accessing to encoding-history information to improve the protection capability of data stored in flash modules.

SUMMARY

In an aspect of the invention, an embodiment introduces a method for accessing to encoding-history information to include: providing a super-block formed by storage space of a plurality of flash units, where the super-block includes zones, each zone includes super-page strings, and each super-page string includes pages across the flash units; and programming the encoding-history information into a metadata section of a designated first page of a designated super-page string, thereby enabling a damaged page that is occurred in the designated super-page string of the designated zone to be recovered according to the encoding-history information.

The encoding-history information includes a history profile and history entries. The history profile indicates which zone or zones are covered in the super-block, and a quantity of the history entries. Each history entry includes information indicating that a designated second page of the designated super-page string in a designated zone hasn't been passed through an engine to generate a parity for the designated super-page string.

In another aspect of the invention, an embodiment introduces a non-transitory computer-readable storage medium for accessing to encoding-history information. The non-transitory computer-readable storage medium includes program code when loaded and executed by a processing unit to realize the method described above.

In still another aspect of the invention, an embodiment introduces an apparatus for accessing to encoding-history information to include: a flash interface; and a processing unit. The processing unit is arranged operably to: provide the super-block formed by storage space of flash units; and program the encoding-history information into a metadata section of a designated first page of a designated super-page string, thereby enabling a damaged page that is occurred in the designated super-page string of the designated zone to be recovered according to the encoding-history information.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
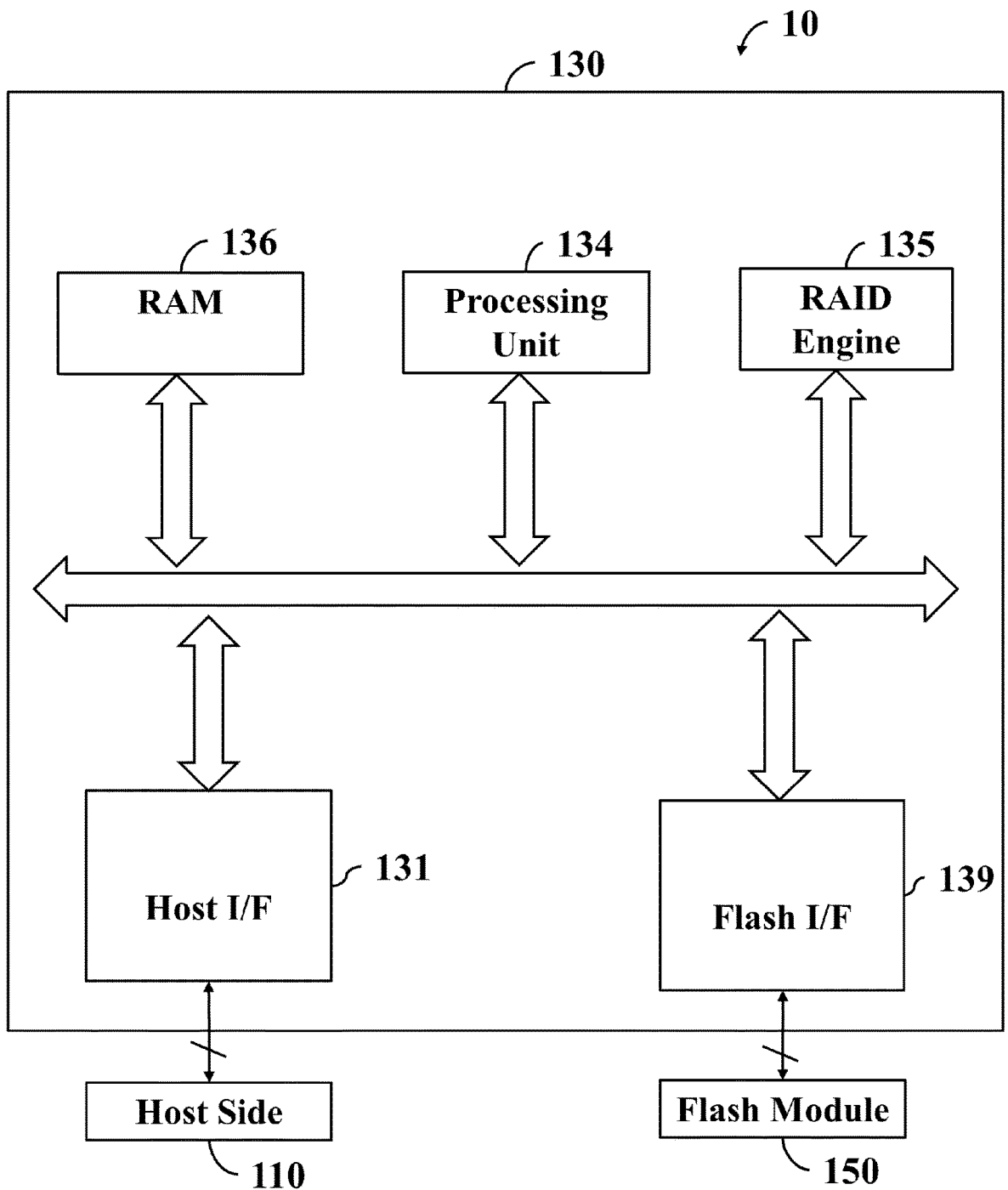
FIG. 1 is the system architecture of an electronic apparatus according to an embodiment of the invention.

Refer to FIG. 1. The electronic apparatus 10 includes a host side 110, a flash controller 130 and a flash module 150, and the flash controller 130 and the flash module 150 may be collectively referred to as a device side. The electronic apparatus 10 may be equipped with a Personal Computer (PC), a laptop PC, a tablet PC, a mobile phone, a digital camera, a digital recorder, smart television, smart refrigerator, or other consumer electronic products. The host side 110 and a host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. A flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes a processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 receives host commands, such as host read, write, discard, trim, erase commands, through the host I/F 131, schedules and executes these commands. The flash controller 130 includes a Random Access Memory (RAM) 136 and the RAM 136 may be implemented in a Dynamic Random Access Memory (DRAM), a Static Random Access Memory (SRAM), or the combination thereof, for allocating space as a data buffer storing user data (also referred to as host data) that is to be programmed into the flash module 150, and has been read from the flash module 150 and is to be output to the host side 110. The RAM 136 stores necessary data in execution, such as variables, data tables, data abstracts, host-to-flash (H2F) tables, flash-to-host (F2H) tables, and so on. The flash I/F 139 includes a NAND flash controller (NEC) to provide functions that are required to access to the flash module 150, such as a command sequencer, a Low Density Parity Check (LDPC) encoder/decoder, etc.

A bus architecture may be configured in the flash controller 130 for coupling between components to transfer data, addresses, control signals, etc., which include the host I/F 131, the processing unit 134, the Redundant Array of Independent Disks (RAID) Engine 135, the RAM 136, the flash I/F 139, and so on. The bus includes a set of parallel physical-wires connected to two or more components of the flash controller 130. The bus is a shared transmission medium so that only two devices can access to the wires to communicate with each other for transmitting data at any one time. Data and control signals travel in both directions between the components along data and control lines, respectively. Addresses on the other hand travel only one way along address lines. For example, when the processing unit 134 wishes to read data from a particular address of the RAM 136, the processing unit 134 sends this address to the RAM 136 on the address lines. The data of that address is then returned to the processing unit 134 on the data lines. To complete the data read operation, control signals are sent along the control lines.

The flash module 150 provides huge storage space typically in hundred Gigabytes (GB), or even several Terabytes (TB), for storing a wide range of user data, such as high-resolution images, video files, etc. The flash module 150 includes control circuits and memory arrays containing memory cells that can be configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals run on physical wires including data lines, a clock signal line and control signal lines for coordinating the command, address and data transfer with the flash module 150. The data lines may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
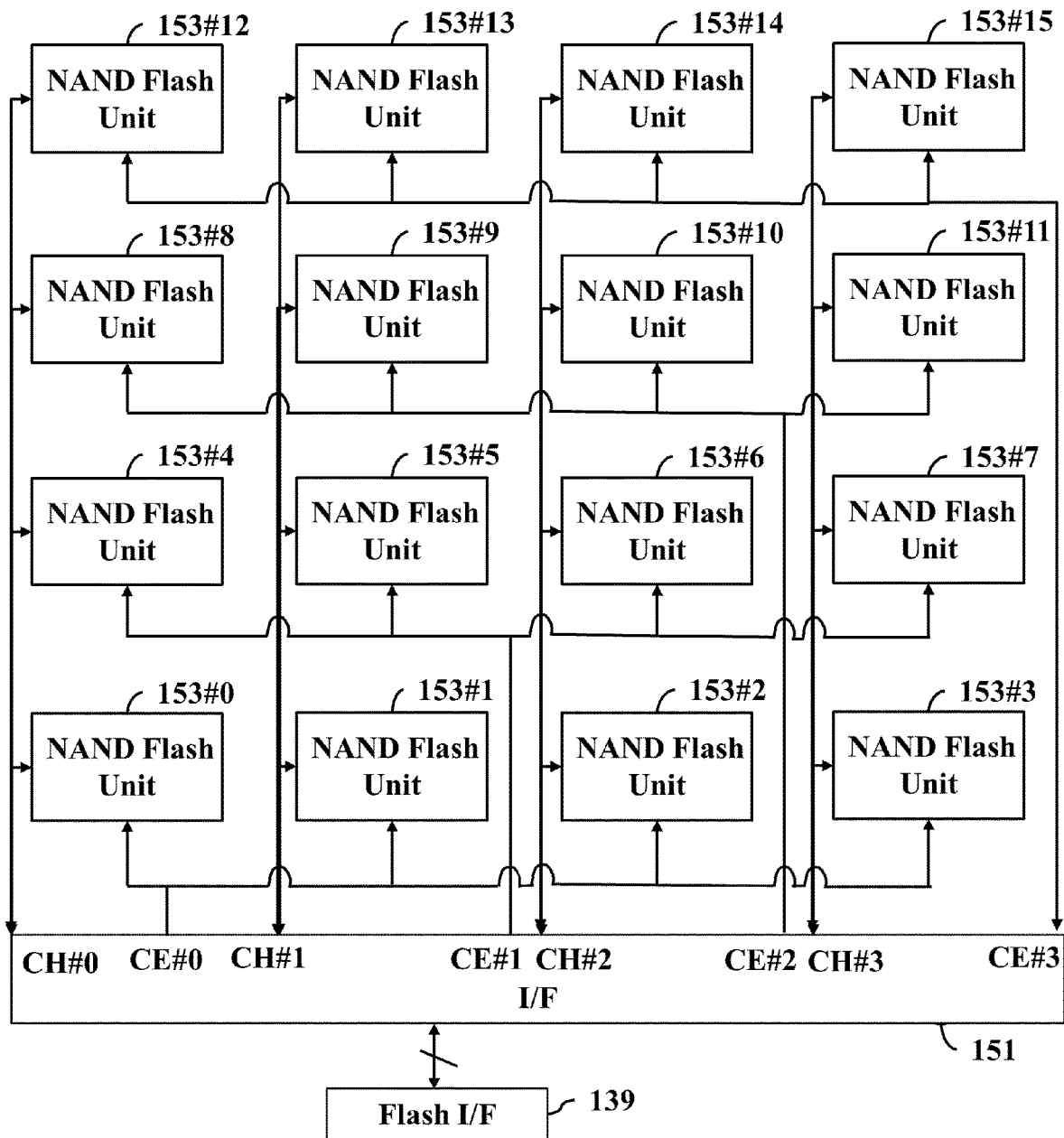
FIG. 2 is a schematic diagram illustrating a flash module according to an embodiment of the invention.

Refer to FIG. 2. The flash I/F 151 may include four I/O channels (hereinafter referred to as channels) CH #0 to CH #3 and each is connected to four NAND flash units, for example, the channel CH #0 is connected to the NAND flash units 153 #0, 153 #4, 153 #8 and 153 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel. Those artisans may modify the design of the flash modules 150 to include more or less channels, and/or make each channel connect more or less NAND flash units according to different system requirements, and the invention should not be limited thereto.

The RAID engine 135 may perform a variety of procedures, such as clear and encode, encode, terminate encode, terminate, resume, etc., according to the instructions issued by the processing unit 134. When receiving the clear and encode instruction, the controller in the RAID engine 135 reads data of multiple host pages (such as thirty-two host pages) from a designated address (also called source address) in the RAM 136 through the shared bus, and overwrites the data stored in the SRAM of the RAID engine 135 with the read data. When receiving the encode instruction, the controller in the RAID engine 135 reads data of multiple host pages from a designated address in the RAM 136 through the shared bus, performs the logical Exclusive-OR (XOR) operation on the read data, and the data stored in the SRAM of the RAID engine 135, and overwrites the data stored in the SRAM of the RAID engine 135 with the calculated result. When receiving the terminate encode instruction, the controller in the RAID engine 135 reads data of multiple host pages from a designated address in the RAM 136 through the shared bus, performs the logical XOR operation on the read data, and the data stored in the SRAM of the RAID engine 135, overwrites the data stored in the SRAM of the RAID engine 135 with the calculated result, and store the calculated result in a designated address (also called destination address) in the RAM 136 through the shared bus.

Figure 3:
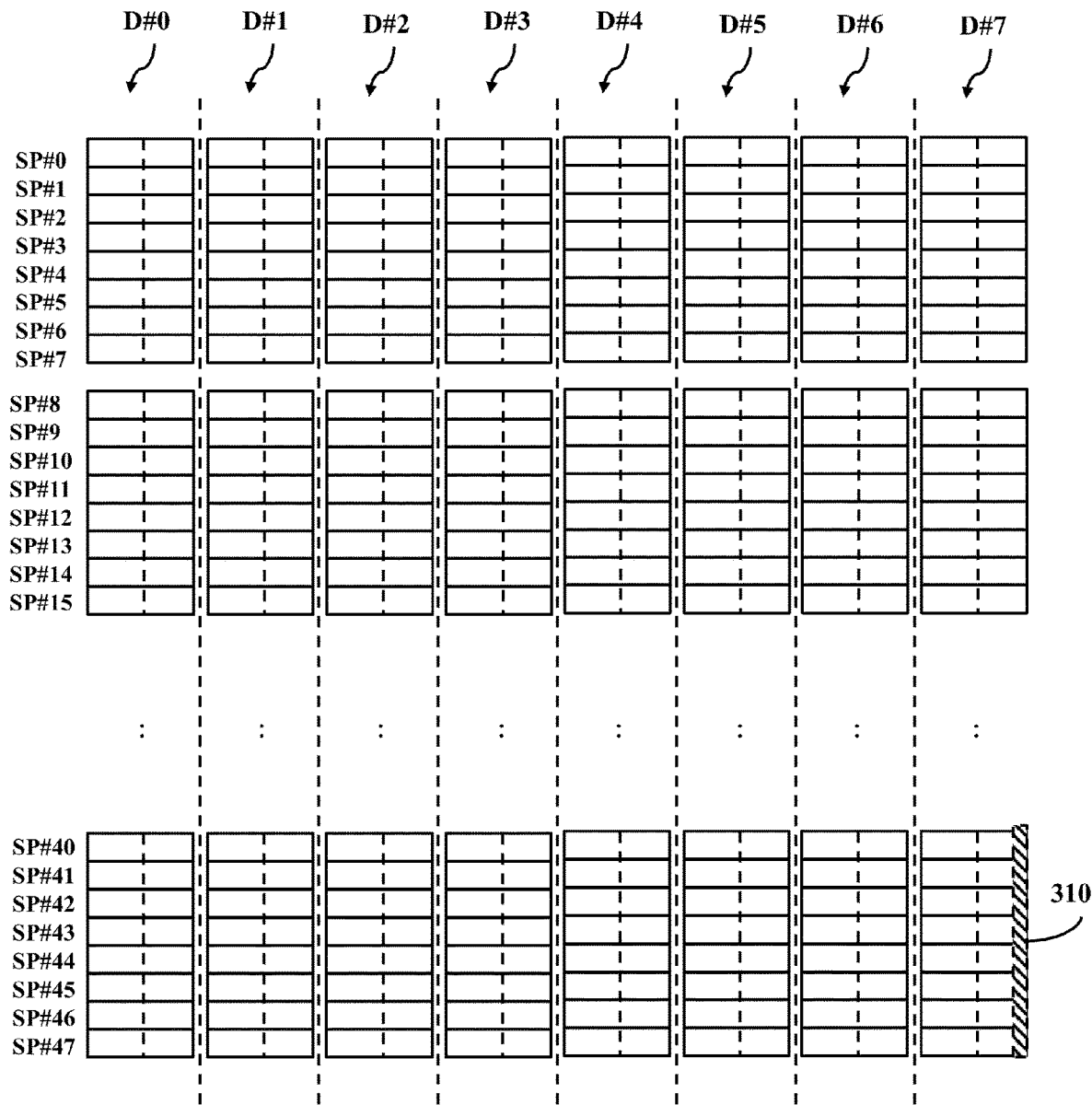
FIG. 3 is a schematic diagram illustrating a logical super-block according to an embodiment of the invention.
Figure 4:
FIG. 4 is a schematic diagram illustrating a logical super-block segmented by zones according to an embodiment of the invention.

Refer to FIG. 3 showing a schematic diagram of one exemplary logical super-block. For example, eight NAND flash units D #0 to D #7 may be arranged in the flash module 150, each NAND flash unit provides storage space of multiple physical blocks, each physical block holds data of a predefined number of pages (e.g. 384 pages), and each page may include a data section and a metadata section. The data section of each page may store 4 KB of data, and the metadata section may store information describing the content stored in the data section. In each of the NAND flash units D #0 to D #7, one physical block may include forty-eight super pages, numbered as SP #0 to SP #47 sequentially, each super page includes two data planes, and each data plane includes four pages. That is, each super page includes eight pages. The super pages with the same super-page number in the NAND flash units D #0 to D #7 may form a super-page string, and the pages in the super-page string are numbered as P #0 to P #63 sequentially.

The RAID engine may encode (for example, perform the XOR operation) data of the 63 pages in each super-page string to generate a parity page, and store the parity page in the designated page in the super-page string. For example, the RAID engine 135 may encode data of the $0^{th}$ page of the $0^{th}$ data plane of the NAND flash unit D #0 to the $2^{nd}$ page of the $1^{st}$ data plane of the NAND flash unit D #7 in one super-page string, and store the encoded result in the $3^{rd}$ page (referred to as the parity page) of the $1^{st}$ data plane of the NAND flash unit D #7. The encoding operation may be implemented in a normal write procedure or a sudden power-off recover (SPOR) procedure. During the normal write procedure, certain pages may be filled with useless dummy values and the dummy values do not need to be encoded by the RAID engine 135. The pages storing the dummy values are referred to as dummy pages. During the SPOR procedure, the RAID engine does not encode data of an uncorrectable error correction code (UECC) page.

When a dummy page is generated or an UECC page is detected, the processing unit 134 marks the page and write the marked information (may be referred to as encoding-history information) into the designated location of one super-block. Afterwards, when the RAID engine 135 needs to recover a page which includes at least one error bit, the processing unit 134 reads the marked information from the designated location in the flash module 150, so as to avoid mistakenly using data in dummy pages and/or UECC pages for decoding (or error checking and correcting). In some implementations, a bitmap is used to represent the marked information, in which each bit indicates whether the data of the corresponding page is encoded by the RAID engine 135, "1" means that it has been encoded, "0" means that it hasn't been encoded. For example, in the bitmap, the $0^{th}$ bit represents the $0^{th}$ page of the $0^{th}$ data plane of the NAND flash unit D #0; the $1^{st}$ bit represents the $1^{st}$ page of the $0^{th}$ data plane of the NAND flash unit D #0, and so on. For each of the dummy pages and the UECC pages, the corresponding bit in the bitmap is "0". The processing unit 134 may drive the flash I/F 139 to program the bitmap into the metadata sections of the last pages (as shown in the backslash region 310) of the super pages SP #40 to SP #47. However, the space of the metadata section that is used to store the bitmap is limited. Supposed that each metadata section of the backslash region 310 provides the storage space of 40 bytes, that is, all metadata sections of the backslash region 310 can represent encoding-history information for 40×8×8=2560 pages. The space is insufficient for the arrangement of the super-block as shown in FIG. 3 because the exemplary super-block includes 348×8=3072 pages in total.

To address the aforementioned problems, an embodiment of the invention introduces further segmentation to the logical super-block. One super-block includes six zones, numbered as Z #0 to Z #5, and each zone includes eight super-page strings, numbered as Str #0 to Str #7. The encoding-history information may include a history profile and multiple history entries. The history profile may be represented as the following data structure: {z_begin, z_end, h_qty, history[ ]}, where z_begin and z_end represent the numbers of the start zone and the end zone, which are used to indicate the zone range where one or more history entries are located; h_qty represents the quantity of history entries; history[ ] is an array of history entries. The maximum number of history entries varies with the available space in one metadata section. Each history entry may be represented as the following data structure: {w, x, y, z}, in which w indicates the zone number where this history entry is located; x indicates the super-page string number where this history entry is located; y indicates the start page number associated with this history entry; z indicates the quantity of consecutive pages. The start page number and the quantity of consecutive pages are used to indicate Each physical block in the NAND flash unit may be labeled as a data block, a current block or a system block according to its functionality. The processing unit 134 selects one empty physical block as the current block for each NAND flash unit for preparing to program user data received from the host side 110. To improve the efficiency of data programming, the user data provided by the host side is programmed into the designated pages of the current blocks in multiple NAND flash units in parallel. The aforementioned super-block may include all or a portion of the current blocks in the NAND flash units. After all pages of one current block are filled with user data, or the remaining pages of one current block are filled with dummy values, the current block is changed to the data block, in other words, the user data stored in the data block is not changed until the data block is erased. Afterwards, the processing unit 134 selects another empty physical block as a new current block. Additionally, the processing unit 134 may configure specific physical blocks as system blocks for storing management information, such as the flash identifier (ID), the bad block table, the bad column table, the host-to-flash mapping (H2F) table, etc.

If a sudden power off (SPO) occurs during a data programing into the super-block, the previously programmed pages of data may be damaged. Therefore, after the power supply to the system is restored, the processing unit 134 needs to perform the entire or a portion of the data programming again in the SPOR process to find the interruption point (i.e. the UECC page) first, and then program the user data downwards after marking the interruption point.

To address the aforementioned problems, an embodiment of the invention introduces a method for accessing to encoding-history information, performed by the processing unit 134 when loading and executing program code of Firmware Translation Layer (FTL). The method includes: providing a super-block formed by storage space of a plurality of flash units (such as the NAND flash units D #0 to D #7); programming encoding-history information into a metadata section of a designated first page of a designated super-page string, wherein the encoding-history information comprises a history profile and a plurality of history entries, the history profile comprises which zones are covered in the super-block, and a quantity of the history entries, and each history entry comprises information indicating that a designated second page of the designated super-page string in a designated zone hasn't been passed through an engine to generate a parity; when a damaged page is detected in the designated super-page string of the designated zone, reading the encoding-history information from the metadata section of the designated first page of the designated super-page string in the flash module 150; discarding the designated second page according to the encoding-history information; and feeding the content of remaining pages of the designated super-page string in the designated zone page by page to the engine to restore the damaged page.

Figure 5:
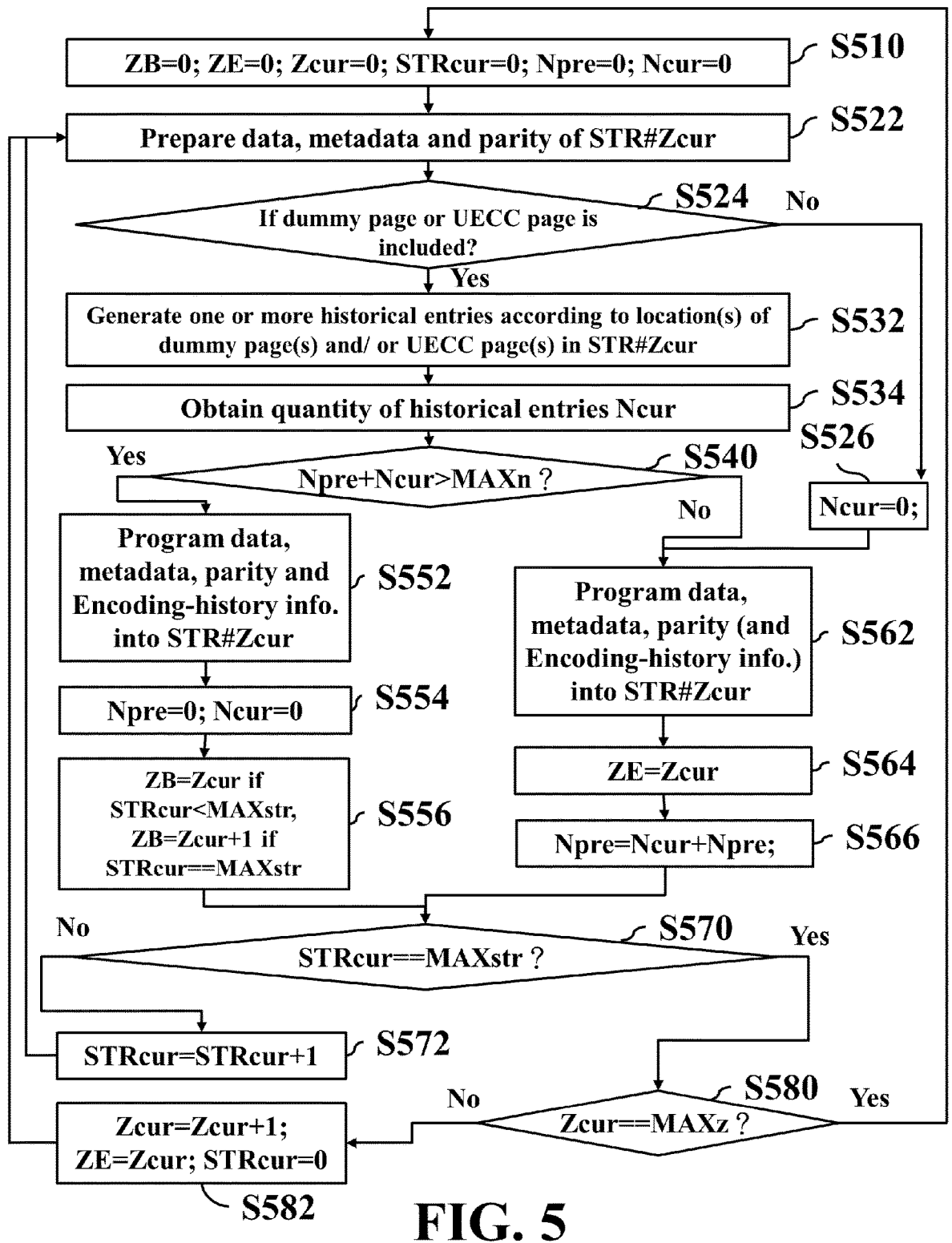
FIG. 5 is a flowchart illustrating a method for programming data according to an embodiment of the invention.

Refer to FIG. 5 illustrating a flowchart of a method for programming data, performed by the processing unit 134 when loading and executing relevant program code. The method includes an outer loop (steps S510 to S582) and an inner loop (steps S522 to S582) that are iteratively performed. The outer loop is used to program data, metadata, parity and encoding-history information into a super-block, and the inner loop is used to program a portion of the data, the metadata, the parity and the encoding-history information into a super-page string of the super-block. Details are described as follows:

Step S510: The variables used during the execution process are initialized: ZB=0; ZE=0; Zcur=0; STRcur=0; Npre=0; Ncur=0. ZB stores the number of the start zone for the collection of history entries, ZE stores the number of the end zone for the collection of history entries, Zcur stores the number of the current zone, STRcur stores the number of the current super-page string, Npre stores the quantity of history entries that have been accumulated previously, Ncur stores the quantity of history entries for the current super-page string.

Step S522: The data, the metadata and the parity for multiple pages of the super-page string #Zur are prepared.

In the normal write procedure, the processing unit 134 stores the collected data and metadata of the super-page string STR #Zcur in the RAM 136 temporarily and feeds them to the RAID 135 page by page to generate the parity.

In the SPOR procedure, if the interruption point hasn't been found, then the processing unit 134 reads the content of the super-page string STR #Zcur and inspect whether there is a UECC page in the super-page string. If the interruption point is found in the super-page string STR #Zcur, the processing unit 134 stores the collected data and metadata of the super-page string STR #Zur before and after the interruption point of the super-page string STR #Zur in the RAM 136 temporarily and feeds them to the RAID 135 page by page to generate the parity. If the interruption point is not found in the super-page string STR #Zcur, the processing unit 134 stores the collected data and metadata of the super-page string STR #Zcur in the RAM 136 temporarily and feeds them to the RAID 135 page by page to generate the parity.

In the SPOR procedure, if the interruption point has been found before the super-page string STR #Zcur, the processing unit 134 stores the collected data and metadata of the super-page string STR #Zcur in the RAM 136 temporarily and feeds them to the RAID 135 page by page to generate the parity.

Step S524: It is determined whether the collected pages include any dummy page or UECC page. If so, the process proceeds to step S532. Otherwise, the process proceeds to step S526.

Step S526: Ncur is set to 0 to indicate that the collected pages do not include any dummy page or UECC page.

Step S532: One or more history entries are generated according to the location(s) of the dummy page(s) and/or the UECC page(s) in the super-page string STR #Zcur. For example, the processing unit 134 generates two history entries: {0, 0, 15, 1} and {0, 0, 34, 2} in response that the $15^{th}$ page, and the $34^{th}$ to the $35^{th}$ pages of the $0^{th}$ super-page string of the $0^{th}$ zone are dummy pages.

Step S534: The quantity of the history entries Ncur is obtained. For example, if two history entries are generated in step S532, then Ncur=2.

Step S540: It is determined whether Npre plus Ncur is greater than MAXn, where MAXn is a preset constant for limiting the quantity of the history entries. If so, it means that the generated history profile and entry/entries need to be programmed into the metadata section of one designated page of the super-page string STR #Zcur, and the process proceeds to step S552. Otherwise, it means that the currently generated history profile and history entry/entries do not need to be programmed, and can continue to be accumulated, and the process proceeds to step S562.

Step S552: The flash I/F 139 is driven to program the collected data, metadata, parity and encoding-history information into at least one physical address corresponding to the super-page string STR #Zcur (and the former ones). For example, the data and its metadata are programmed into physical addresses corresponding to the pages P #0 to P #62 in the super-page string STR #Zcur, and the parity and the encoding-history information are programmed into the physical address corresponding to the page P #63 in the super-page string STR #Zcur. It is to be understood that, after the encoding-history information is programmed into the flash module 150, the processing unit 134 may clear the encoding-history information temporarily stored in the RAM 136. Note that, if the interruption point hasn't been found in the super-page string STR #Zcur in the SPOR procedure, then the flash I/F is not driven to perform actual programming for the collected data, metadata, parity and encoding-history information.

Step S554: Npre and Ncur are set to 0.

Step S556: If STRcurr is less than MAXstr, it means that the data of this zone hasn't been programmed completely, then ZB is set to Zcur (i.e. the number of the current zone). If STRcurr is equal to MAXstr, it means that the data of this zone has been programmed completely, then ZB is set to Zcur plus one (i.e. the number of the next zone).

Step S562: If the current super-page string is not the last super-page string of the processed super-block, then the flash I/F 139 is driven to program the collected data, metadata and parity into at least one physical address corresponding to the super-page string STR #Zcur (and the former ones). For example, the data and its metadata are programmed into physical addresses corresponding to the pages P #0 to P #62 in the super-page string STR #Zcur, and the parity is programmed into the physical address corresponding to the page P #63 in the super-page string STR #Zcur. If the current super-page string is the last super-page string of the processed super-block, then the flash I/F 139 is driven to program the collected data, metadata, parity and encoding-history information into at least one physical address corresponding to the super-page string STR #Zcur (and the former ones). Note that, if the interruption point hasn't been found in the super-page string STR #Zcur in the SPOR procedure, then the flash I/F is not driven to perform actual programming for the collected data, metadata, parity and encoding-history information.

Step S564: NE is set to Ncur.

Step S566: Npre is set to Ncur plus Npre for storing the quantity of the accumulated history entries that haven't been programmed into the flash module 150.

Step S570: It is determined whether STRcur is equal to MAXstr, where MAXstr is a preset constant to indicate the maximum number of the super-page strings in one zone. If so, it means that the next super-page string to be processed is located in the next zone, then the process proceeds to step S580. Otherwise, it means that the next super-page string to be processed is located in the same zone, then the process proceeds to step S572.

Step S572: STRcur is increased by one.

Step S580: It is determined whether Zcur is equal to MAXz, where MAXz is a preset constant to indicate the maximum number of the zones in one super-block. If so, it means that the next zone to be processed is located in the next super-block, then the process proceeds to step S510. Otherwise, it means that the next zone to be processed is located in the same super-block, then the process proceeds to step S582.

Step S582: Zcur is increased by one, ZE is set to Zcur and STRcur is set to 0.

Figure 6:
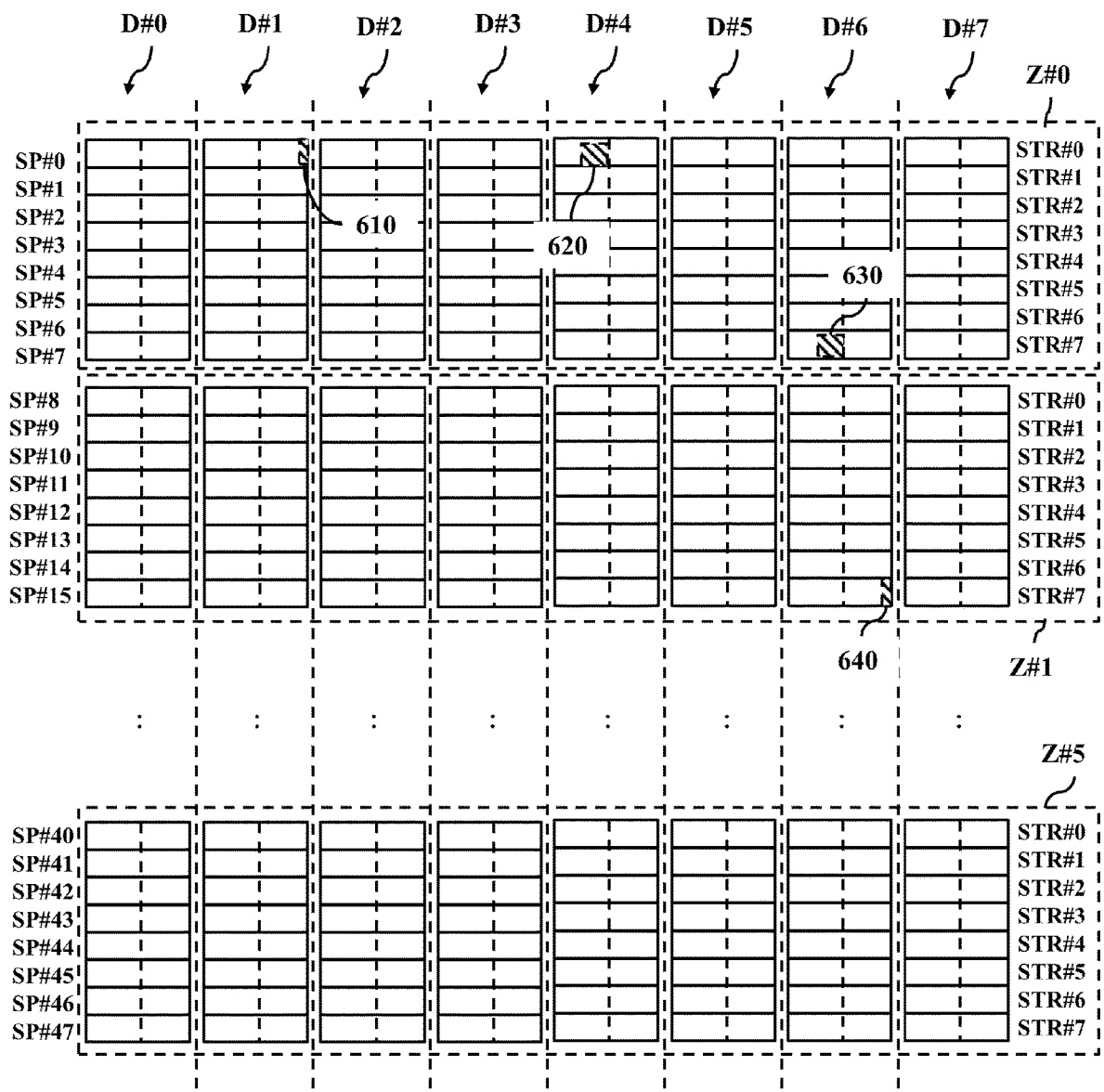
FIG. 6 is a schematic diagram showing data writes according to an embodiment of the invention.

Refer to FIG. 6 showing exemplary data writes. Assumed that MAXn is set to 1.

In the loops for dealing with the super-page string STR #0 in the zone Z #0, the processing unit 134 detects that the 15$^{th}$ page 610 and the 34$^{th}$ to the 35$^{th}$ pages 620 are dummy pages (the "Yes" path of step S524), and then, generates two history entries: {0, 0, 15, 1} and {0, 0, 34, 2} (step S532). Since the processing unit 134 further detects that Npre+Ncur=2 is greater than MAXn=1 (the "Yes" path of step S540), the data and its metadata are programmed into physical addresses corresponding to the pages P #0 to P #62 in the super-page string STR #0 of the zone Z #0, and the parity and the encoding-history information (including z_begin=0, z_end=0, h_qty=2, history[ ]={0, 0, 15, 1},{0, 0, 34, 2}) are programmed into the physical address corresponding to the page P #63 in the super-page string STR #0 of the zone Z #0 (step S552).

In the loops for dealing with the super-page string STR #7 in the zone Z #0, the processing unit 134 detects that the 50$^{th}$ to the 51$^{th}$ pages 630 are dummy pages (the "Yes" path of step S524), and then, generates one history entry: {0, 7, 50, 2} (step S532). Since the processing unit 134 further detects that Npre+Ncur=1 is not greater than MAXn=1 (the "No" path of step S540), the data and its metadata are programmed into physical addresses corresponding to the pages P #0 to P #62 in the super-page string STR #7 of the zone Z #0, and the parity is programmed into the physical address corresponding to the page P #63 in the super-page string STR #7 of the zone Z #0 (step S562).

In the loops for dealing with the super-page string STR #7 in the zone Z #1, the processing unit 134 detects that the 55$^{th}$ page 640 is the dummy page (the "Yes" path of step S524), and then, generates one history entry: {1, 7, 55, 1} (step S532). Since the processing unit 134 further detects that Npre+Ncur=2 is greater than MAXn=1 (the "Yes" path of step S540), the data and its metadata are programmed into physical addresses corresponding to the pages P #0 to P #62 in the super-page string STR #7 of the zone Z #1, and the parity and the encoding-history information (including z_begin=0, z_end=1, h_qty=2, history [ ]={0, 7, 50, 2}, {1, 7, 55, 1}) are programmed into the physical address corresponding to the page P #63 in the super-page string STR #0 of the zone Z #0 (step S552).

In the loops for dealing with the super-page string STR #7 in the zone Z #5, since the processing unit 134 does not discover any dummy page (the "No" path of step S524), the data and its metadata are programmed into physical addresses corresponding to the pages P #0 to P #62 in the super-page string STR #7 of the zone Z #5, and the parity and the encoding-history information (including z_begin=2, z_end=5, h_qty=0, history[ ]=NULL) are programmed into the physical address corresponding to the page P #63 in the super-page string STR #7 of the zone Z #5 (step S562).

Although the above embodiments describe that the encoding-history information is stored in the metadata section of the last page of one super-page string, and the parity is stored in the data section of the last page of this super-page string, those artisans may modify to store the encoding-history information in other location of this super-page string.

In alternative embodiments, the processing unit 134 may not store the encoding-history information in the last page of one super-page string, but store the encoding-history information in the page containing the parity of this super-page string. For example, the processing unit 134 may store the parity of one super-page string in the data section of the page P #0 of this super-page string, and store the encoding-history information in the metadata section of the page P #0 of this super-page string.

In alternative embodiments, the processing unit 134 may store the encoding-history information in the last page of one super-page string, but not store the parity of this super-page string in the last page of one super-page string. For example, the processing unit 134 may store the parity of one super-page string in the data section of the page P #0 of this super-page string, and store the encoding-history information in the metadata section of the page P #63 of this super-page string.

Figure 7:
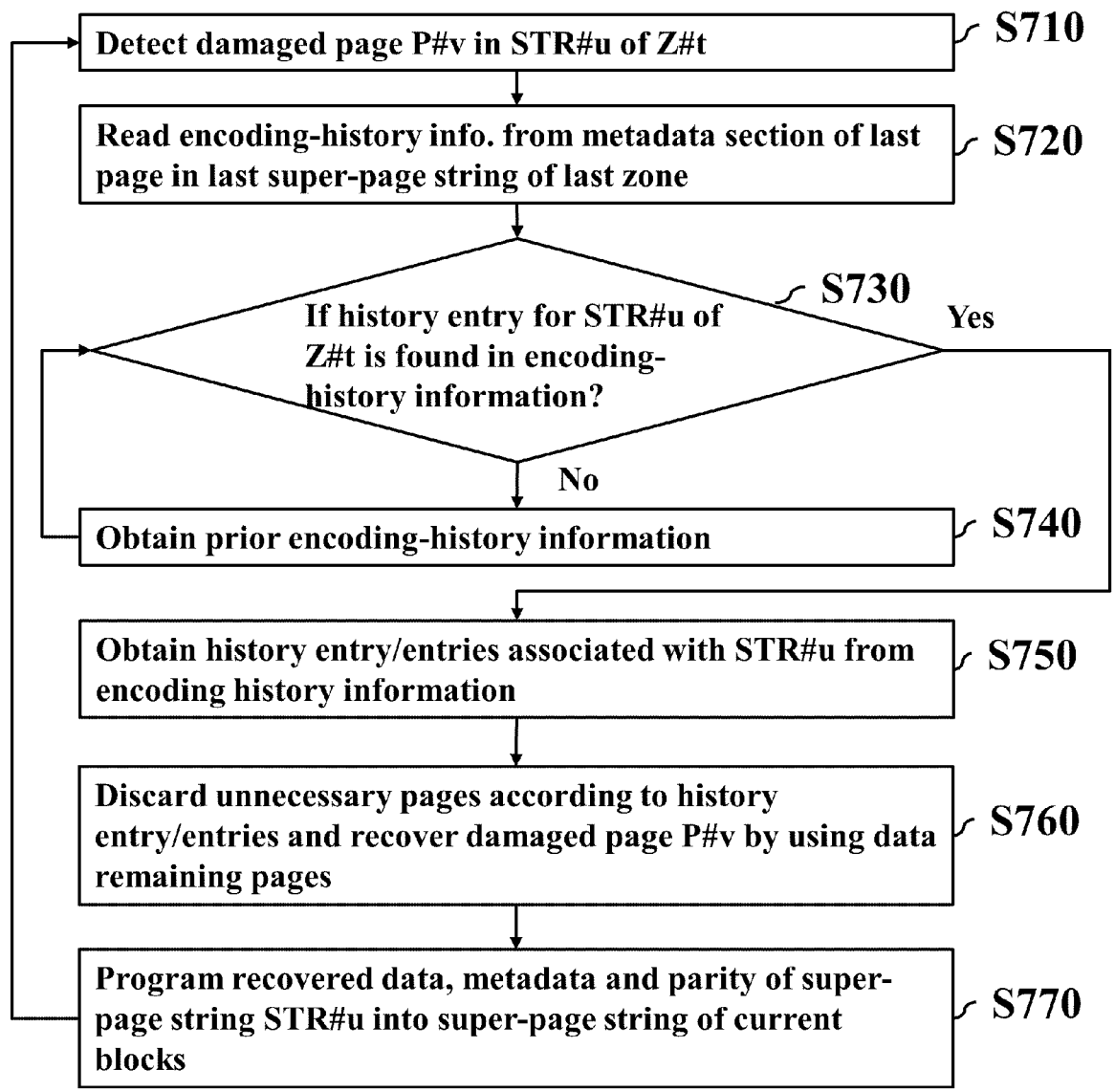
FIG. 7 is a flowchart illustrating a method for correcting read errors according to an embodiment of the invention.

Refer to FIG. 7 illustrating a flowchart of a method for correcting read errors, performing by the processing unit 134 when loading and executing relevant program code. Details are described as follows:

Step S710: The damaged page P #v is detected in the super-page string STR #u of the zone Z #t, where t represents any integer ranging from 0 to MAXz, and MAXz indicates the maximum zone number of one super-block; u represents any integer ranging from 0 to MAXu, and MAXu indicates the maximum super-page string number of one zone; and v represents any integer ranging from 0 to MAXv, and MAXv indicates the maximum page number of one super-page string.

Step S720: The encoding-history information is read from the metadata section of the last page in the last super-page string of the last zone.

Step S730: It is determined whether the history entry for the super-page STR #u of the zone Z #t is found in the encoding-history information. If so, the process proceeds to step S750. Otherwise, the process proceeds to step S740.

Step S740: The prior encoding-history information is obtained. The processing unit 134 may scan the designated location of the metadata section of the last page in each super-page string from the last super-page string of the zone Z #z_begin backwards through the flash I/F 139, and determine whether encoding-history information can be found from them. The earliest found encoding-history information is referred to as the prior encoding-history information. If it is not found in the zone Z #z_begin, then the processing unit 134 may scan the designated location of the metadata section of the last page in each super-page string from the last super-page string of the previous one zone of the zone Z #z_begin backwards through the flash I/F 139 until any encoding-history information is found.

Step S750: The history entry or entries associated with the super-page string STR #u are obtained from the encoding-history information.

Step S760: Unnecessary pages (e.g. the dummy pages, the UECC pages, etc.) are discarded according to the history entry or entries, and data of the remaining pages are fed to the RAID engine 135 page by page to recover the damaged page P #v, and a new parity is generated according to the recovered content of super-page string STR #u.

Step S770: The flash I/F 139 is driven to program the recovered data, metadata and parity of the super-page string STR #u into a super-page string of the current blocks.

Following the example as shown in FIG. 6, assumed that the damaged page P #0 is detected in the super-page string STR #7 of the zone Z #0:

The processing unit 134 reads the encoding-history information (including z_begin=2, z_end=5, h_qty=0, history[ ]=NULL) (step S720). Subsequently, the processing unit 134 scans the designated location of the metadata section in the last page of each super-page string backwards from the last super-page string of the zone Z #2, but finds no encoding-history information. The processing unit 134 continues to scan the zone Z #1, and finds the encoding-history information (including z_begin=0, z_end=1, h_qty=2, history[ ]={0, 7, 50, 2}, {1, 7, 55, 1}) in the metadata section of the last page P #63 of the last super-page string STR #7 of the zone Z #1 (step S740). Since the history entry {0, 7, 50, 2} associated with the super-page string STR #7 of the zone Z #0 is found in the encoding-history information (the "Yes" path of step S730), the processing unit 134 discards unnecessary pages P #50 and P #51 according to the history entry, feeds the content of the remaining pages to the RAID engine 135 page by page to recover the damaged page P #0, generates a new parity according to the recovered content of the super-page string STR #u (step S760), and programs the recovered data, metadata and parity of the super-page string STR #u into a super-page string of the current blocks (step S770).

Some or all of the aforementioned embodiments of the method of the invention may be implemented in a computer program such as a driver for a dedicated hardware, a firmware translation layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 and 2, it should be noted that additional elements may be included to achieve better performance without departing from the spirit of the invention. Each element of FIGS. 1 and 2 is composed of various circuits and arranged operably to perform the aforementioned operations. While the process flows described in FIGS. 5 and 7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for accessing to encoding-history information, performed by a processing unit, comprising:
providing a super-block formed by storage space of a plurality of flash units, wherein the super-block comprises a plurality of zones, each zone comprises a plurality of super-page strings, and each super-page string comprises a plurality of pages across the flash units; and
programming the encoding-history information into a metadata section of a designated first page of a designated super-page string, wherein the encoding-history information comprises a history profile and a plurality of history entries, the history profile indicates which zone or zones are covered in the super-block, and a quantity of the history entries, and each history entry comprises information indicating that a designated second page of the designated super-page string in a designated zone hasn't been passed through an engine to generate a parity for the designated super-page string, thereby enabling a damaged page that is occurred in the designated super-page string of the designated zone to be recovered according to the encoding-history information.

2. The method of claim 1, comprising:
when a damaged page is detected in the designated super-page string of the designated zone, reading the encoding-history information from the metadata section of the designated first page of the designated super-page string;
discarding the designated second page according to the encoding-history information; and
feeding content of remaining pages of the designated super-page string of the designated zone to the engine to recover the damaged page.

3. The method of claim 1, wherein the designated second page is a dummy page or an uncorrectable error correction code (UECC) page, and the dummy page is filled with dummy values.

4. The method of claim 1, wherein a data section of the designated first page stores a parity for the pages of the designated super-page string.

5. The method of claim 1, wherein the designated first page is a last page of the designated super-page string.

6. The method of claim 1, wherein the designated first page is a last page of the designated super-page string, and a data section of the designated first page stores a parity for the pages of the designated super-page string.

7. A non-transitory computer-readable storage medium for accessing to encoding-history information when executed by a processing unit, the non-transitory computer-readable storage medium comprising program code to:
provide a super-block formed by storage space of a plurality of flash units, wherein the super-block comprises a plurality of zones, each zone comprises a plurality of super-page strings, and each super-page string comprises a plurality of pages across the flash units; and
program the encoding-history information into a metadata section of a designated first page of a designated super-page string, wherein the encoding-history information comprises a history profile and a plurality of history entries, the history profile indicates which zone or zones are covered in the super-block, and a quantity of the history entries, and each history entry comprises information indicating that a designated second page of the designated super-page string in a designated zone hasn't been passed through an engine to generate a parity for the designated super-page string, thereby enabling a damaged page that is occurred in the designated super-page string of the designated zone to be recovered according to the encoding-history information.

8. The non-transitory computer-readable storage medium of claim 7, comprising program code to:
when a damaged page is detected in the designated super-page string of the designated zone, read the encoding-history information from the metadata section of the designated first page of the designated super-page string;
discard the designated second page according to the encoding-history information; and
feed content of remaining pages of the designated super-page string of the designated zone to the engine to recover the damaged page.

9. The non-transitory computer-readable storage medium of claim 7, wherein the designated second page is a dummy page or an uncorrectable error correction code (UECC) page, and the dummy page is filled with dummy values.

10. The non-transitory computer-readable storage medium of claim 7, wherein a data section of the designated first page stores a parity for the pages of the designated super-page string.

11. The non-transitory computer-readable storage medium of claim 7, wherein the designated first page is a last page of the designated super-page string.

12. The non-transitory computer-readable storage medium of claim 7, wherein the designated first page is a last page of the designated super-page string, and a data section of the designated first page stores a parity for the pages of the designated super-page string.

13. The non-transitory computer-readable storage medium of claim 7, wherein the history profile stores a start zone number and an end zone number to indicate which zone or zones are covered in the super-block, each history entry stores a zone number, a super-page string number, a start page number and a quantity of consecutive pages, the zone number and the super-page string number indicate where a corresponding history entry is located, and the start page number and the quantity of the quantity of consecutive pages indicate which page or pages haven't been passed through the engine to generate the parity for the designated super-page string.

14. An apparatus for accessing to encoding-history information, comprising:

a flash interface, coupled to a flash module; and
a processing unit, coupled to the flash interface, arranged operably to: provide a super-block formed by storage space of a plurality of flash units, wherein the super-block comprises a plurality of zones, each zone comprises a plurality of super-page strings, and each super-page string comprises a plurality of pages across the flash units; and program the encoding-history information into a metadata section of a designated first page of a designated super-page string, wherein the encoding-history information comprises a history profile and a plurality of history entries, the history profile indicates which zone or zones are covered in the super-block, and a quantity of the history entries, and each history entry comprises information indicating that a designated second page of the designated super-page string in a designated zone hasn't been passed through an engine to generate a parity for the designated super-page string, thereby enabling a damaged page that is occurred in the designated super-page string of the designated zone to be recovered according to the encoding-history information.

15. The apparatus of claim 14, wherein the processing unit is arranged operably to: when a damaged page is detected in the designated super-page string of the designated zone, read the encoding-history information from the metadata section of the designated first page of the designated super-page string; discard the designated second page according to the encoding-history information; and feed content of remaining pages of the designated super-page string of the designated zone to the engine to recover the damaged page.

16. The apparatus of claim 14, wherein the designated second page is a dummy page or an uncorrectable error correction code (UECC) page, and the dummy page is filled with dummy values.

17. The apparatus of claim 14, wherein a data section of the designated first page stores a parity for the pages of the designated super-page string.

18. The apparatus of claim 14, wherein the designated first page is a last page of the designated super-page string.

19. The apparatus of claim 14, wherein the designated first page is a last page of the designated super-page string, and a data section of the designated first page stores a parity for the pages of the designated super-page string.

20. The apparatus of claim 14, wherein the history profile stores a start zone number and an end zone number to indicate which zone or zones are covered in the super-block, each history entry stores a zone number, a super-page string number, a start page number and a quantity of consecutive pages, the zone number and the super-page string number indicate where a corresponding history entry is located, and the start page number and the quantity of the quantity of consecutive pages indicate which page or pages haven't been passed through the engine to generate the parity for the designated super-page string.

\* \* \* \* \*